UNITED STATES PATENT OFFICE.

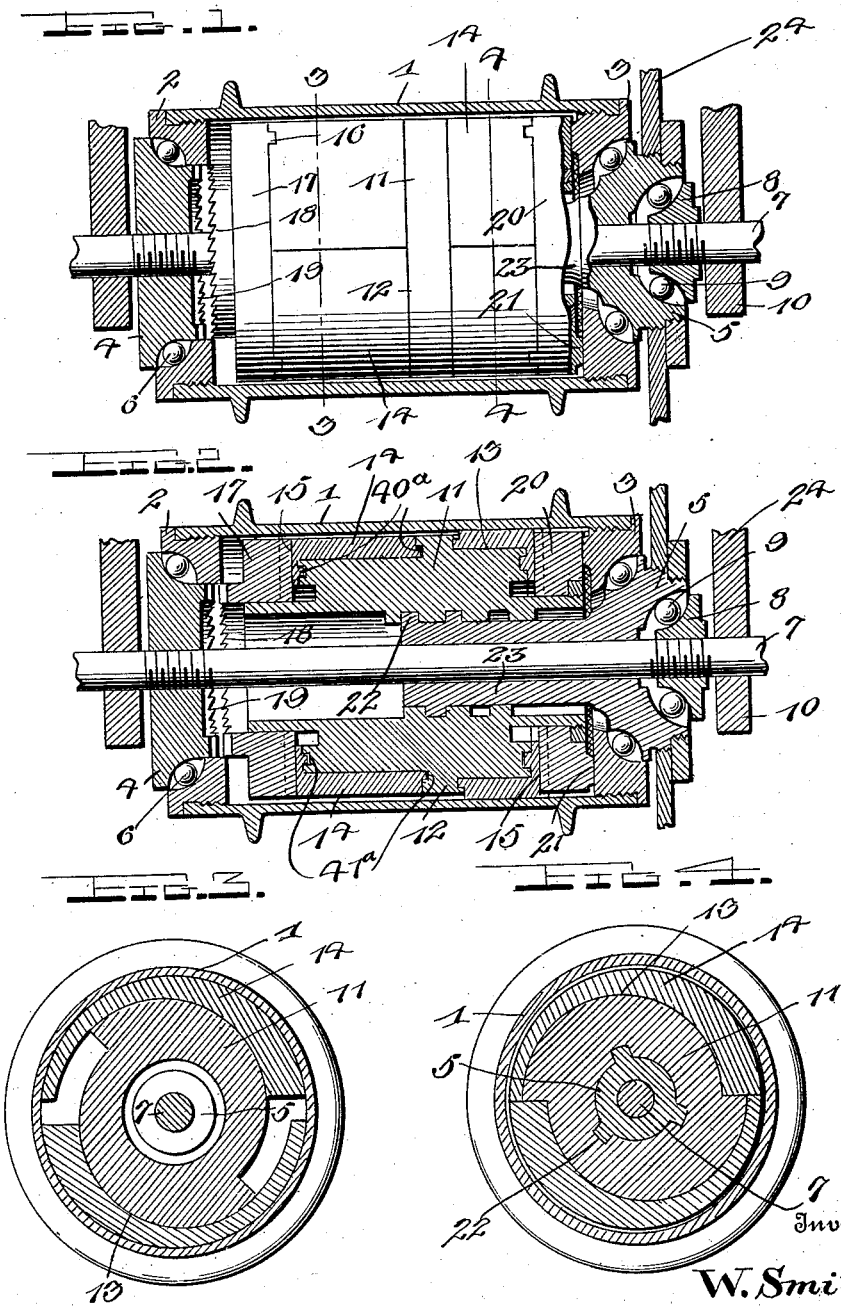

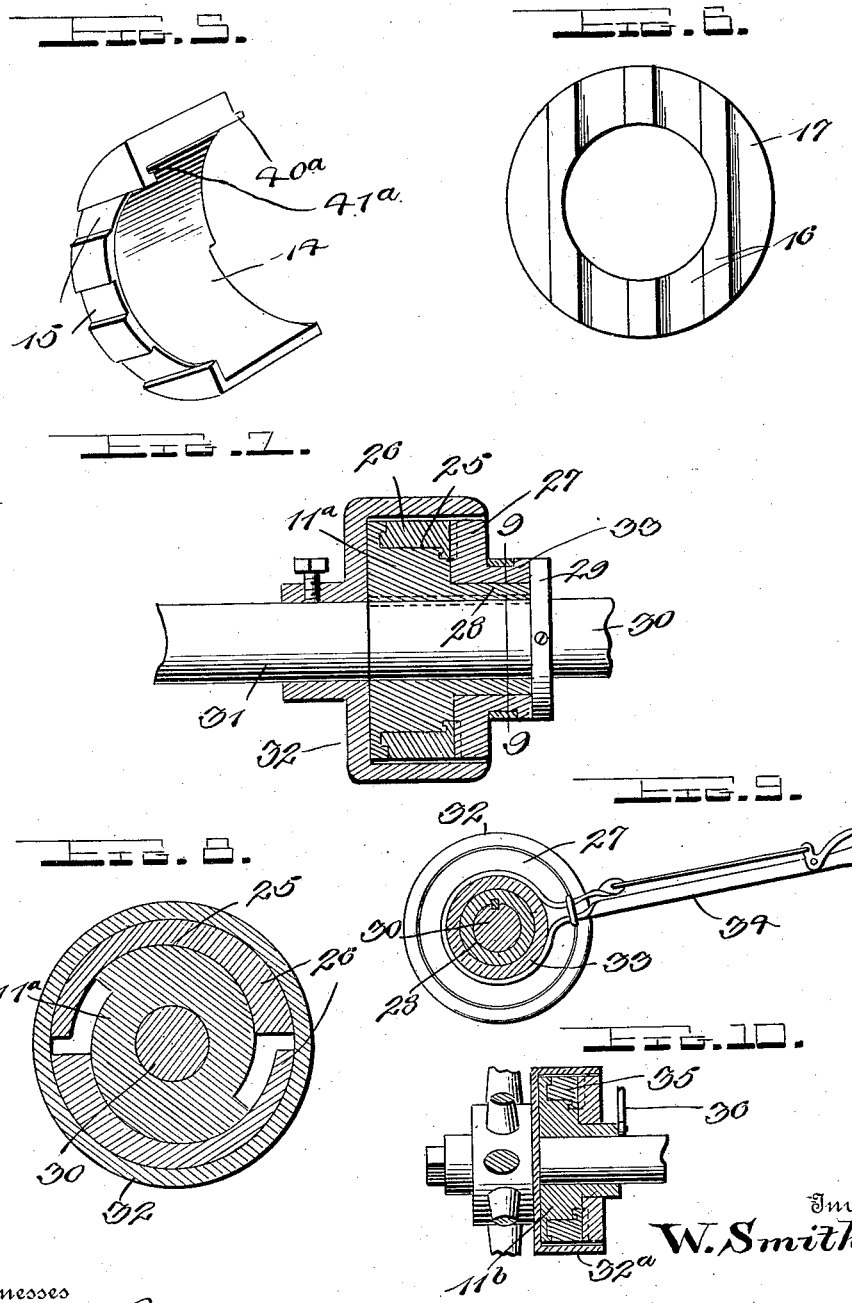

WARREN SMITH, OF SAPULPA, OKLAHOMA, ASSIGNOR OF ONE-FOURTH TO ANNA B. THOMPSON, ONE-FOURTH TO ELEANOR A. SMITH, AND THREE-SIXTEENTHS TO ELBERT C. WALLACE, ALL OF SAPULPA, OKLAHOMA.

CLUTCH.

1,082,657.  Specification of Letters Patent. Patented Dec. 30, 1913.

Application filed May 16, 1912. Serial No. 697,743.

*To all whom it may concern:*

Be it known that I, WARREN SMITH, a citizen of the United States, residing at Sapulpa, in the county of Creek and State of Oklahoma, have invented certain new and useful Improvements in Clutches, of which the following is a specification, reference being had to the accompanying drawings.

This invention comprehends certain new and useful improvements in clutches of the expansible segment type, the present invention being designed for use as a clutch and brake for motorcycles, automobiles, or other vehicles, or merely as a clutch for connecting together two shafts, it being understood that the invention is applicable for several uses and that it is not confined to the adaptations illustrated in the accompanying drawings.

The invention has for its primary object a simple, durable and efficient construction of clutch device, the parts of which are so arranged that they will work positively and not be liable to get out of order. And the invention also aims to generally improve devices of this class and to render them more useful and commercially desirable.

With these and other objects in view, as will more fully appear as the description proceeds, the invention consists in the constructions, arrangements, and combinations of the parts that I shall hereinafter fully describe and claim.

For a full understanding of the invention, reference is to be had to the following description and accompanying drawings, in which—

Figure 1 is a sectional view, partly in elevation, illustrating one embodiment of my invention as incorporated in the hub of the driving or rear wheel of a motorcycle or the like; Fig. 2 is a transverse sectional view through the device; Fig. 3 is a section on the line 3—3 of Fig. 1; Fig. 4 is a similar view on the line 4—4 of Fig. 1; Fig. 5 is a detail perspective view of one of the expansible segments; Fig. 6 is an inner face view of one of the rings; Fig. 7 is a sectional view of the device arranged as a clutch for connecting together the adjoining ends of two shafts; Fig. 8 is a transverse sectional view through the device illustrated in Fig. 7; Fig. 9 is a section on the line 9—9 of Fig. 7, illustrating a hand lever which may be used to operate the device; and Fig. 10 is a sectional view illustrating still another embodiment of the invention.

Corresponding and like parts are referred to in the following description and designated in the accompanying drawings by like reference characters.

In that embodiment of the invention illustrated in Figs. 1 to 6 inclusive, the numeral 1 designates a wheel hub which is provided at its ends with bearing rings designated 2 and 3, said rings being respectively formed with ball races which co-act with corresponding races on rings 4 and 5, anti-friction balls 6 being interposed between said races, as clearly illustrated in Figs. 1 and 2. 7 designates the axle, said axle being provided with a cone bearing 8 for anti-friction balls 9 and being mounted at its ends in frame members which are indicated at 10. The shaft 7 is threaded to hold the ring 4 in fixed relation thereto. A spool 11 is contained within the hub 1, said spool being formed intermediate of its ends with an annular rib 12, the periphery of the spool on opposite sides of said rib being formed with cam surfaces 13, the cam surfaces of one peripheral portion extending in opposite directions from the cam surfaces of the other peripheral portion. Mounted on the cam surfaces 13 are expansible segments 14, there being two sets of such segments, one set being held separated from the other by the rib 12. The outer faces of one pair of segments are ribbed and grooved, as idicated at 15, (see Fig. 5), for engagement by interlocking ribs and grooves 16 formed on one face of a ring 17. The ring 17 is formed on its outer face with a preferably toothed rim 18 designed for engagement with the teeth 19 that are formed on the inner face of the ring 4. The opposite pair of the segments 14 are correspondingly connected in interlocked relation to a ring 20 which is formed on its outer face with teeth 21 designed to mesh with corresponding teeth formed on the inner face of the ring 3. The interior of the spool 11 is formed with a spiral thread 22 and designed for engagement with the threaded inner end of a spindle 23, said spindle being designed to carry a sprocket wheel or other driving element which is indicated in Figs. 1 and 2 at 24.

From as much of the description as has preceded, in connection with the correlated views of the accompanying drawings, it will be understood that when motion is imparted to the sprocket wheel 24 in a direction to drive the vehicle forwardly, the threaded engagement between the spindle 23 and the spool 11 will draw the spool to the right as viewed in Figs. 1 and 2 so as to effect the engagement of the rings 20 and 3 and the spool 11 will be rotated so that the cam surfaces thereon will serve to expand the segments which will firmly grip the inner surface of the hub 1. A reverse movement imparted to the sprocket 24 will manifestly shift the spool 11 toward the left, whereby the teeth 18 and 19 will interlock to hold the ring 17 stationary, and the rotation of the spool will cause the other segments to expand on their cam surfaces so as to produce a braking action on the hub. When the sprocket 24 is not rotated in either direction, the spool 11 will merely maintain a neutral position and none of the segments will be forced out into engagement with the hub.

In that embodiment of the invention illustrated in Fig. 7, the spool is designated $11^a$ and is formed with cam surfaces 25 on which the segments 26 are mounted. The segments are formed on their outer faces with grooves and ribs which interlock with corresponding parts formed on a ring 27 which is held in turn on the reduced neck 28 of the spool $11^a$, being held in position by a collar 29 fixed on a shaft section 30 to which the spool $11^a$ is also fixed. 31 designates a corresponding shaft section which abuts against the end of the shaft section 30 and carries a relatively fixed casing 32 against which the segments 26 are designed to be expanded so as to couple one shaft to the other. In order to turn the ring 27, the same is provided with a grooved neck 33 on which a hand lever 34 is mounted, as illustrated in Fig. 9.

In that embodiment of the invention illustrated in Fig. 10, the device is indicated as an expanding brake for the hub of an automobile wheel, the spool being designated $11^b$, the casing being designated $32^a$ and the segments being designated 35. 36 designates a link which is secured to the spool so as to turn the same around and thereby force the segments out into engagement with the hub casing $32^a$. The link 36 may be connected in any desired way to a hand lever or foot pedal operable by the driver of the machine, but as such connection does not, of itself, form any part of the present invention, I have not illustrated it. In the operation of this form of the invention, it is to be understood that the segments $11^b$ are connected to a collar like that illustrated in Fig. 6, such collar being fixed to the frame of the vehicle. When pressure is applied to the brake lever, the segments are prevented from rotating by engagement with the part illustrated in Fig. 6, but are permitted to move out against the casing $32^a$ in an obvious manner.

As best illustrated in Fig. 2, the cams and segments are movably connected together by laterally disposed projections $40^a$ and corresponding grooves $41^a$, whereby the segments are held down on the spool and returned to their original position when required.

While the accompanying drawings illustrate what I believe to be the preferred embodiment of my invention, it is to be understood that the invention is not limited thereto, but that various changes may be made in the construction, arrangement and proportions of the parts without departing from the scope of the invention as defined in the appended claims.

Having thus described the invention, what is claimed is:—

1. A device of the character described including a hub, an axle mounted within said hub, a spindle mounted on said axle, an interiorly threaded spool having threaded engagement with said spindle, said spool being formed with oppositely disposed cam surfaces, segments mounted on said cam surfaces, a pair of rings mounted on said spool and adapted for interlocking engagement with said segments, a ring mounted on said hub and adapted for engagement with one of the first mentioned rings, a ring mounted on said axle and adapted for engagement with the other of said first mentioned rings, and means for shifting said spool, as and for the purpose described.

2. A device of the character described, including a hub, an axle mounted within said hub, a spindle mounted on said axle, a spool provided with oppositely disposed cam surfaces mounted on said spindle, toothed rings, one of said rings mounted in said hub and the other ring mounted on said axle, segments mounted on the cam surfaces, rings interlocking with said segments, and means for shifting said spool to the right or to the left, whereby to effect the engagement of one pair of rings and permit of the disengagement of the other pair.

3. A device of the character described, including a spool formed with cam faces, expansible segments mounted on said faces, means for relatively turning the segments and the spool, whereby to expand the segments, a casing against which the segments are designed to be expanded, and interlocking groove and projection connections between said segments and cams, for the purpose specified.

In testimony whereof I hereunto affix my signature in the presence of two witnesses.

WARREN SMITH.

Witnesses:
E. C. WALACE,
E. MAE CARDON.